Feb. 5, 1963  D. H. KAPLAN  3,076,354
DIFFERENTIAL GEAR TRANSMISSION MECHANISM
Filed May 29, 1959  3 Sheets-Sheet 1
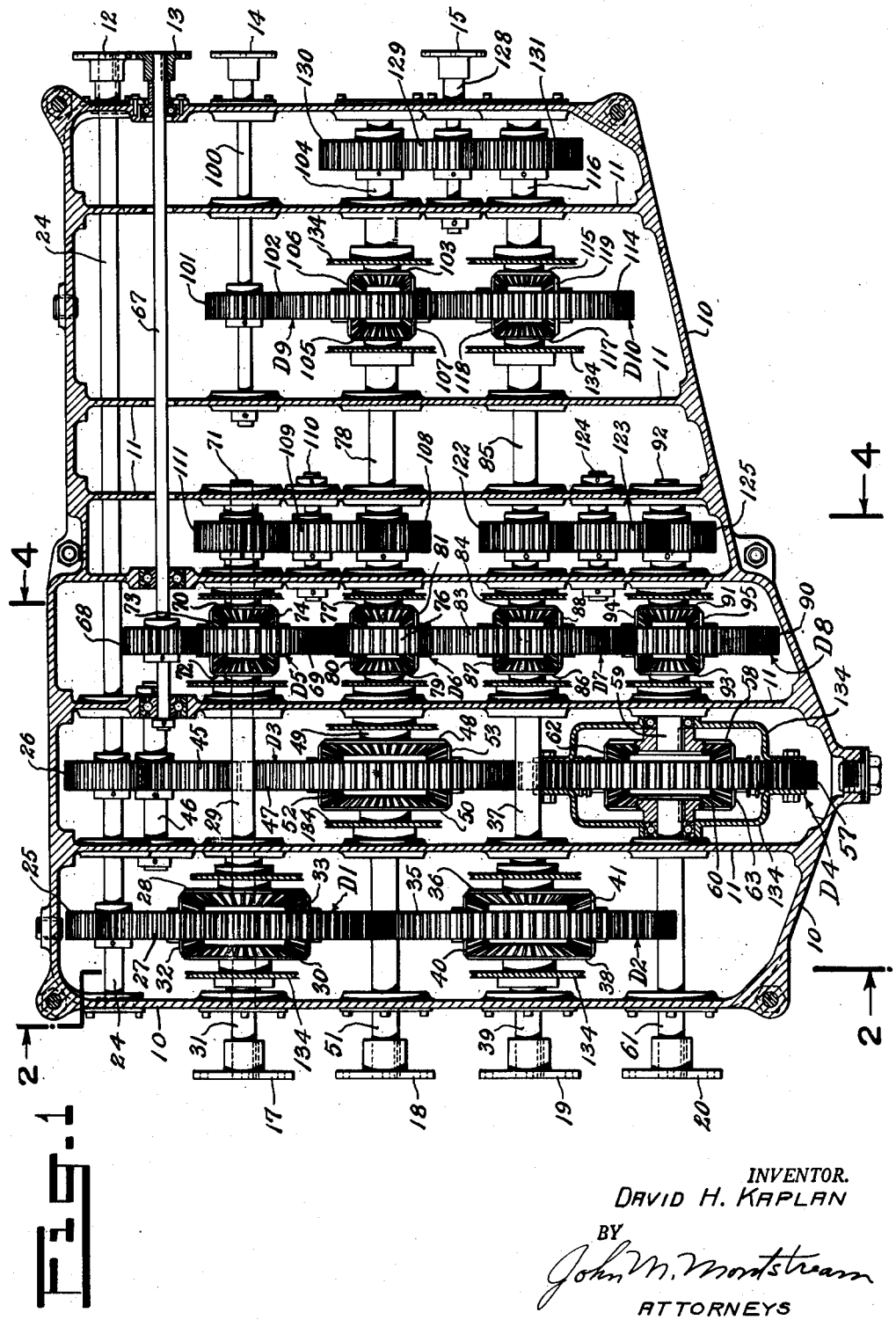
INVENTOR.
DAVID H. KAPLAN
BY
John M. Montstream
ATTORNEYS Feb. 5, 1963      D. H. KAPLAN      3,076,354
DIFFERENTIAL GEAR TRANSMISSION MECHANISM
Filed May 29, 1959      3 Sheets-Sheet 2
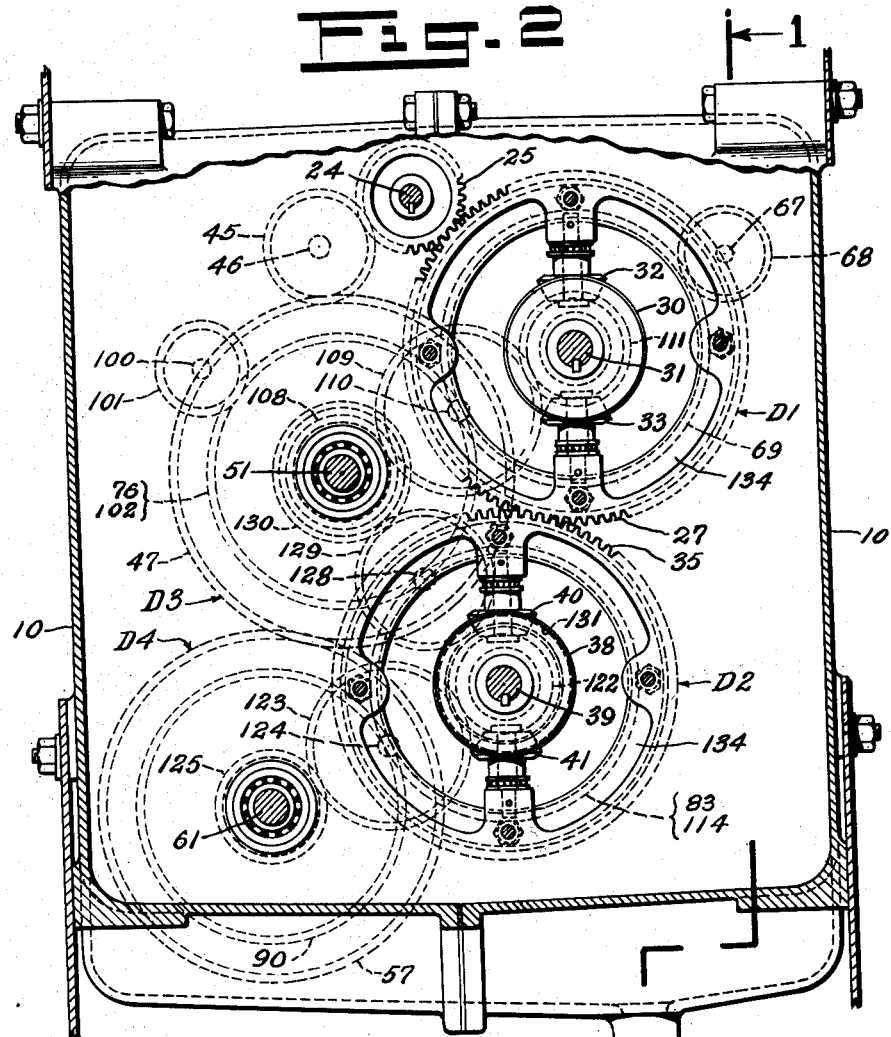
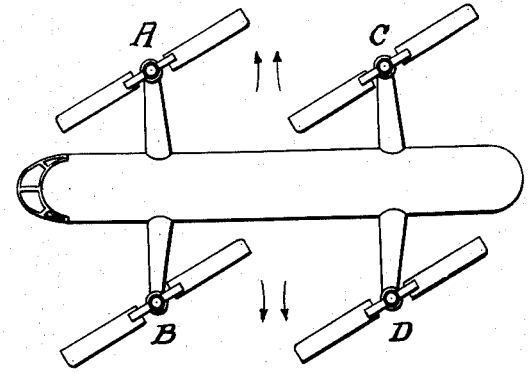
INVENTOR.
DAVID H. KAPLAN
BY John M. Montstream
ATTORNEYS

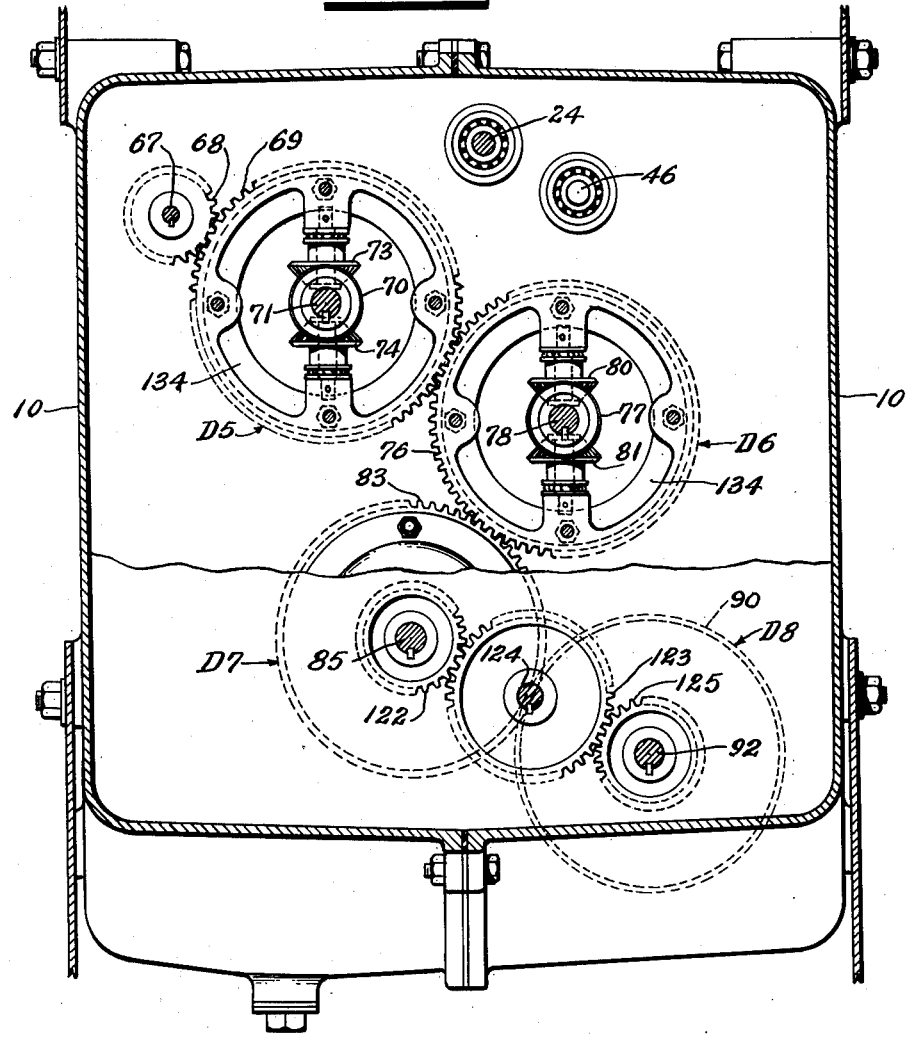

United States Patent Office 3,076,354
Patented Feb. 5, 1963

3,076,354
DIFFERENTIAL GEAR TRANSMISSION MECHANISM
David H. Kaplan, Huntington, N.Y., assignor to Convertawings, Inc., Amityville, N.Y., a corporation of New York
Filed May 29, 1959, Ser. No. 816,769
18 Claims. (Cl. 74—675)

The invention relates to a transmission mechanism which may serve as a control system by means of which actuation of any one of two or more input elements results in particular movement of at least three output elements in specific ways as will appear. Specifically with four output elements and four input elements, actuation of one input element will produce turning or rotation of the four output elements in the same direction or sense. Actuation of a second input element will result in two of the output elements being actuated in one direction and the other two being turned or rotated in a reverse direction. Actuation of a third input element will result in turning or rotation of a different pair of the four output elements in one sense or direction and the other pair of output elements in the opposite direction. Actuation of the fourth input element will result in turning or rotation of a still different pair of the output elements in one direction or sense and the remaining pair in the opposite direction or sense.

The above result has been achieved through a lever system disclosed in application S.N. 761,422 filed September 16, 1958, now Patent 3,008,524. The construction particularly illustrated and described herein is one involving gear mechanisms for achieving the same result which gear mechanism is capable of being mounted in a compact housing occupying little space. In addition in being a gear mechanism there may be continuous or unlimited drive or rotation of the input elements with continuous drive of the output elements which is not possible with the lever system of the above identified application. Again the gear mechanism lends itself to substantial variations in the relationship of amplification or diminution of input distance or revolutions with respect to output distance or revolutions. Further this result is achieved in a very compact space. Also the construction herein lends itself more suitably to automation and motor drives.

In the prior application the mechanism described is pointed out as being applicable to any four unit device such as four propellers of a ship and application particularly shown is to control of the blades of an aircraft of the helicopter type having four rotors. The transmission mechanism herein has the same applications.

It is an object of the invention to construct a compact transmission or control mechanism for a device or apparatus having three or more controllable units.

Another object of the invention is to construct a control or transmission mechanism having three or more controllable units which uses gears rather than levers.

Another object of the invention is to construct a control or transmission mechanism for apparatus which is capable of vernier or close control, thereby rendering the mechanism more suitable than heretofore in applications to automatic control.

A further object of the invention is to construct a geared transmission which will replace the more conventional lever and crank type control means.

A still further object of the invention is to construct a control or transmission mechanism which can be standardized and thereby adaptable to any mechanism such as aircraft having four propulsive units.

Other objects of the invention will be apparent from the following description when taken in connection with the accompanying drawings illustrating a preferred embodiment thereof in which:

FIG. 1 is essentially a plan view of the transmission mechanism mounted on a frame or housing with the housing cut away on line 1—1 of FIG. 2 to disclose the mechanism;
FIG. 2 is an end view of the transmission mechanism taken from line 2—2 of FIG. 1;
FIG. 3 is a plan view of a four rotor aircraft; and
FIG. 4 is a section taken on line 4—4 of FIG. 1.

The transmission or control mechanism is mounted in a frame which preferably is in the form of a housing 10 and may have a series of partitions 11 to provide additional support for at least some of the mechanism with the walls of the housing or frame. The mechanism includes input means comprising at least two input elements with four input elements 12, 13, 14 and 15 being particularly shown and shown as extending exteriorly of the frame or housing. The mechanism also includes output means including at least three primary output elements, there being four such output elements 17, 18, 19 and 20 particularly illustrated and shown as extending exteriorly of the housing. The output and input elements may take the form of rotating shafts or elements. The input elements and output elements conveniently project through opposite ends of the housing although this location is not essential.

In an application of the transmission mechanism particularly to a four rotor helicopter the input element 12 is connected to the foot pedals usually provided which is manipulated by the pilot for producing differential control of the pitch of the blades of pairs of rotors and particularly increasing the pitch of one cross pair of rotors and decreasing the pitch of the other pair of cross rotors to produce yaw in the aircraft. Input element 13 is operatively connected with the control stick of the aircraft. Such control stick is mounted for fore and aft movement and for lateral movement and the input element 13 is operatively connected with the control stick so as to be responsive to the lateral movement of the control stick to produce differential control of the pitch of the side pairs of rotors to produce aircraft roll. Input element 14 is operatively connected to the control stick of the aircraft and responsive to fore and aft movement thereof to control differential pitch of the blades of the fore and aft pairs of rotors to produce pitch in the aircraft, that is, nose down pitch or nose up pitch. Input element 15 is operatively connected with a pilot operated lever or means for changing the pitch of the blades of the four rotors in the same direction namely increasing or decreasing the pitch of the blades of all of the rotors. This latter control provides for ascent, descent and hovering of the aircraft.

Operation of the input element 12 turns the shaft 24 and the gears 25 and 26 secured thereto. Gear 25 is in mesh with a carrier gear 27 of a differential gear means D1 including an input gear 28 carried on a shaft 29, an output gear 30 secured to a shaft 31 which carries output element 17 and a pair of planetary gears 32 and 33 freely rotatable on the carrier gear 27 and both meshing with gears 28 and 30. Meshing with the carrier gear 27 is a carrier gear 35 of a second differential gear means D2 which includes an input gear 36 secured to a shaft 37, an output gear 38 secured to a shaft 39 on which is mounted the output element 19 and a pair of planetary gears 40 and 41 rotatably mounted on the carrier gear and each meshing with the gears 36 and 38.

The gear 26 meshes with a gear 45 mounted on a shaft 46 mounted between a pair of partitions 11 which gear meshes with a carrier gear 47 of a differential gear means D3. This differential gear means includes an input gear 48 secured to a shaft 49 rotatably mounted in a partition 11, an output gear 50 carried by a shaft 51 which carries the output element 18 and a pair of planetary gears 52 and 53 rotatably mounted on the sun gear 47 and each meshing with the gears 48 and 50. The carrier gear 47 of differential means D3 meshes with a carrier gear 57 of a differential gear means D4. The differential means D4 includes an input gear 58 secured to a shaft 59 rotatably mounted in a partition 11, an input gear 60 secured to a shaft 61 which carries the output element 20 and a pair of planetary gears 62 and 63 rotatably mounted on the carrier gear 57 and each meshing with the gears 58 and 60.

The two gears 25 and 26 provide an operative connection between carrier gears 27 and 45 and it is convenient to operatively connect the input element 12 therewith. In a transmission mechanism having four input elements, the differential means D1, D2, D3 and D4 constitute a third or last differential unit or set of differential means.

It has been mentioned that for a yaw maneuver of an aircraft, operation of the input element 12 produces differential control of the pitch of the blades of cross pairs of rotors. As far as the transmission mechanism is concerned, the gear 28 and its shaft 29 of differential D1, the gear 36 and its shaft 37 of differential D2, gear 48 and its shaft 49 of differential D3 and gear 58 and its shaft 59 of differential D4 are held stationary by whatever is connected with the other input elements such as the pilot control mechanism of a helicopter. Rotation of the input element 12 and its shaft 24 in a clockwise direction will rotate gear 25 and carrier gear 27 counterclockwise which rotates gears 30, its shaft 31 and output element 17 in a counter-clockwise direction. This same rotation of input element 12 rotates carrier gear 35 in a clockwise direction which in turn rotates output gear 38, its shaft 39 and output element 19 in a clockwise direction.

The rotation of input element 12 in a clockwise direction also rotates gear 26 in a clockwise direction, gear 45 in a counter-clockwise direction and carrier gear 47 of differential D3 in a clockwise direction. Clockwise rotation of carrier gear 47 rotates gear 50, its shaft 51 and output element 18 in a clockwise direction. Clockwise rotation of carrier gear 47 rotates sun gear 57 of differential D4 in a counter-clockwise direction which in turn rotates output gear 60, its shaft 61 and output element 20 in a counter-clockwise direction.

It will be observed, therefore, that the pair of output elements 17 and 20 rotate in a counter-clockwise direction and the pair of output elements 18 and 19 rotate in a clockwise direction. Since output elements 17 and 20 are to be operatively connected with cross rotors A and D and output elements 18 and 19 are to be connected with the other pair of cross rotors B and C, the result of which is to increase the pitch of the blades of one pair of cross rotors and decrease the pitch of the blades of the other pair of cross rotors to produce a yaw maneuver. It is clear, too, that rotation of input element 12 in a counter-clockwise direction reverses the direction of rotation of the output elements 17, 18, 19 and 20 to produce a yaw in the opposite direction.

For a roll maneuver such as for a four rotor helicopter, input element 13 is operated. As far as the transmission mechanism is concerned, the input element 13 is secured to the shaft 67 on which is secured a gear 68 which gear meshes with a carrier gear 69 of a differential means D5. This differential means includes an input gear 70 secured to a shaft 71 and an output gear 72 secured to shaft 29. Differential means D5 also includes a pair of planetary gears 73 and 74 rotatably mounted on the carrier gear 69 and each operatively connecting or meshing with the gears 70 and 72. Carrier gear 69 meshes with a carrier gear 76 of a differential gear mechanism D6 which differential includes an input gear 77 secured to a shaft 78, an output gear 79 secured to shaft 49. Differential D6 also includes a pair of planetary gears 80 and 81 rotatably mounted on the carrier gear 76 and each meshing with the gears 77 and 79. Carrier gear 76 meshes with a carrier gear 83 of a differential means D7 which differential means includes an input gear 84 secured to the shaft 85 and an output gear 86 secured to shaft 37. This differential means also includes a pair of planetary gears 87 and 88 rotatably mounted on the carrier gear 83 and each meshing with the gears 84 and 86. The carrier gear 83 meshes with a carrier gear 90 of a differential means D8 which differential means includes an input gear 91 secured to a shaft 92 and an output gear 93 secured to shaft 59. Differential means D8 also includes a pair of planetary gears 94 and 95 rotatably mounted on the carrier gear 90 and each meshing with gears 91 and 93. The differential means D5, D6, D7 and D8 constitute a second differential unit or set of differential means in a mechanism having four input elements. The carrier gear of one differential means meshes with the carrier gear of the next differential means of the set to drive one pair in one direction and the other pair in the opposite direction.

It has been described that input element 13 produces a differential change in the pitch of the pairs of side rotors to produce a roll maneuver of an aircraft. This roll maneuver will be described. In describing this operation it is understood that input element 12 is held stationary by pilot control mechanism and hence the carrier gears 27 of differential D1, carrier gear 35 of differential D2, carrier gear 47 of differential D3 and carrier gear 57 of differential D4 are all held stationary. As will be described hereinafter shaft 71 and its gear 70 of differential D5, shaft 78 and its gear 77 of differential D6, shaft 85 and its gear 84 of differential D7, shaft 92 and its gear 91 of its differential gear D8 are also held stationary by control levers or mechanism.

Rotation of input element 13 and its shaft 67 in a clockwise direction rotates gear 68 clockwise and carrier gear 69 counterclockwise which in turn rotates gear 72, shaft 29 and gear 28 in a counterclockwise direction which in turn rotates planetary gears 32 and 33 to rotate gear 30, shaft 31 and the output element 17 in a clockwise direction. Rotation of carrier gear 69 in a counterclockwise direction rotates carrier gear 76 of differential D6 in a clockwise direction which in turn rotates gear 79, shaft 49 and gear 48 in a clockwise direction. Gear 48 through planetary gears 52 and 53 of differential D3 rotates gear 50, shaft 51 and output element 18 in a counterclockwise direction. In the same manner carrier gear 76 rotates carrier gear 83 in a counterclockwise direction which in the same manner described rotates output shaft 39 and output element 19 in a clockwise direction. Also, carrier gear 83 rotates carrier gear 90 in a clockwise direction which in the same manner described rotates output shaft 61 and output element 20 in a counterclockwise direction.

As a result the pair of side rotors B and D have the pitch of their blades differentially operated with respect to the other pair of aft rotors A and C. Differential operation of pairs of side rotors results in a right or left roll of the aircraft. It is clear that rotation of input element 13 in a counterclockwise direction reverses the rotation of the output elements from that described namely output elements 17 and 19 rotate in a counterclockwise direction and output elements 18 and 20 rotate in a clockwise direction to differentially change the pitch of the rotors in the opposite direction.

For a pitch maneuver, input element 14 controls the pitch of the aircraft and therefore differentially controls the pitch of the blades of the fore pair of rotors A and B with respect to the aft pair of rotors C and D. In other words, if the pitch of the blades of the fore pair of rotors is increased or decreased the pitch of the blades of the aft pair of rotors is decreased or increased. The input element 14 is secured to a shaft 100 to which is secured a gear 101. This gear meshes with the carrier gear 102 of a differential means D9 which means includes an input gear 103 secured to a shaft 104 and an output gear 105 secured to shaft 78. The differential D9 also includes a pair of planetary gears 106 and 107 which are rotatably mounted on the carrier gear 102 and each meshes with the gears 103 and 105. The shaft 78 also has secured thereto a gear 108 which meshes with an idler gear 109 rotatably mounted on a shaft 110. The idler gear 109 meshes with a gear 111 which is secured to shaft 71.

Carrier gear 102 meshes with a carrier gear 114 of a differential means D10 which also includes an input gear 115 secured to a shaft 116 and an output gear 117 secured to shaft 85. The differential D10 also includes a pair of planetary gears 118 and 119 which are rotatably mounted on the carrier gear 114 and each meshes with the gears 115 and 117. Shaft 85 has a gear 122 secured thereto which gear meshes with an idler gear 123 rotatably carried on a shaft 124 and the idler gear in turn meshes with a gear 125 secured to shaft 92. The differential means D9 and D10 constitute a first differential unit or set of differential means.

Operation of input element 14 in order to produce pitch control of the rotors of the aircraft will be described. Gears 103 and 115 are held stationary because of their connection with other structure such as pilot control mechanism. Since the input elements 12 and 13 are held stationary carrier gear 27 of differential D1, carrier gear 35 of differential D2, carrier gear 47 of differential D3, carrier gear 57 of differential D4, carrier gear 69 of differential D5, carrier gear 76 of differential D6, carrier gear 83 of differential D7 and carrier gear 90 of differential D8 are all held stationary. With the above in mind rotation of the input element 14 in a clockwise direction rotates shaft 100 and gear 101 to rotate carrier gear 102 in a counterclockwise direction. With gear 103 stationary, output gear 105 rotates in a counterclockwise direction and therefore through gears 108, 109 and 111, gear 70 rotates in a counterclockwise direction. As a consequence output gear 72, shaft 29 and input gear 28 are rotated in a clockwise direction through planetary gears 73 and 74. Through planetary gears 32, 33, output gear 30 is rotated in a counterclockwise direction to rotate shaft 31 and output element 17 in a counterclockwise direction.

It should be mentioned that when shaft 78 rotates counterclockwise and hence its input gear 77 rotates in the same direction to rotate gear 79, its shaft 49 and gear 48 in a clockwise direction through the planetary gears 80 and 81. As a consequence output gear 50, its output shaft 51 and output element 18 is rotated in a counterclockwise direction through the planetary gears 52, 53.

When carrier gear 102 rotates counterclockwise, it rotates carrier gear 114 in a clockwise direction and, therefore, gear 117, its shaft 85 and gear 84 of differential D7 rotate clockwise. As a result gear 86, its shaft 37 and gear 36 of differential D2 rotates in a counterclockwise direction through planetary gears 87 and 88. As a further consequence output gear 38, its output shaft 39 and output element 19 rotates in a clockwise direction through planetary gears 40, 41.

When shaft 85 rotates clockwise, its gear 122 rotates clockwise, the idler gear 123 rotates counterclockwise and gear 125, its shaft 92 and input gear 91 of differential D8 rotate clockwise. As a result output gear 93, its shaft 59 and input gear 58 of differential D4 rotate counterclockwise. As a further result output gear 60, its output shaft 61 and output element 20 rotate clockwise through the planetary gears 62, 63. It will be observed, therefore, that output elements 17 and 18 rotate in the same direction and output elements 19 and 20 rotate in the opposite direction to produce differential change of pitch of the blades of the pair of fore rotors A and B in one direction and changes the pitch of the blades of the aft pair of rotors C and D in the opposite direction to produce a pitch down or pitch up maneuver of the aircraft. It will be understood that rotation of input element 14 in a counterclockwise direction reverses the rotation of the output elements as described.

Collective change of pitch of all four helicopter rotors in the same direction and of all output elements in the same direction will be described. It has been mentioned that operation of input element 15 produces rotation of the output elements 17, 18, 19 and 20 in the same direction. Input element 15 is fixed to shaft 128 on which is secured a gear 129 with which gear 130 meshes and this gear is secured to shaft 104. Gear 129 also meshes with a gear 131 secured to shaft 116. The gear ratio between gear 129 and gears 13 and 131 is shown as 1 to 1 and the ratio between gears 108 and 111 as well as between 122 and 125 is 1 to 1 so that one revolution of input element 15 will produce one revolution of all of the output elements. It is clear that the gear ratio may be selected as desired.

The operation of all of the output shafts in the same direction and hence operation of the pitch of the blades of all of the rotors in the same direction is secured by operation of the input element 15. Since the input elements 12, 13 and 14 are held stationary, the carrier gears of all of the differentials D1 through D10 are held stationary. Clockwise rotation of the input element 15 rotates gear 129 clockwise which turns gear 130 and input gear 103 counterclockwise so that gear 105, shaft 78 and gear 108 also rotate clockwise through the planetary gears 106, 107. As a consequence idler gear 109 rotates counterclockwise to rotate gear 111, its shaft 71 and gear 70 in a clockwise direction. Gear 70 turns the planetary gears 73, 74 to turn gear 72, shaft 29 and gear 28 in a counterclockwise direction. This direction of rotation of gear 28 drives gear 30, output shaft 31 and output element 17 in a clockwise direction through the planetary gears 32, 33 of differential D1.

It has been described that if gear 108 is rotated clockwise this in turn rotates gear 77 in a clockwise direction. As a result gear 79, shaft 49 and gear 48 rotate counterclockwise through planetary gears 80 and 81 of differential D6. This rotation of gear 48 rotates gear 50, output shaft 51 and output element 18 in a clockwise direction through the planetary gears 52, 53 of differential D3. Since the transmission through gears 129 and 131 is the same as that described with gear 130 it is deemed not necessary to trace the direction of rotations through to output shafts 39 and 61 and their output elements 19 and 20 to show that they rotate also in a clockwise direction. Counterclockwise rotation or movement of input element 15 results in counterclockwise movement of all of the output elements. It will be observed, therefore, that through this transmission mechanism the pitch of all of the rotors of a helicopter are changed in the same direction by operation of the input element 15.

The transmission mechanism, need not be as complex as that described, for example the output elements or shafts may be three or at least three in number such as 17, 18 and 19. In such case there are provided three different pairs of output elements and one output element for each pair. The input element 12 will therefore control differential rotation of output elements 18 and 19 as a pair and output element 17 as a single element rotating in the opposite direction. Rotation of input element 13 will result in the pair of output elements 17 and 19 rotating in the same direction and output element 18 rotating in the opposite direction. Also rotation of the input element 14 will rotate elements 17 and 18 in the same direction as a pair and output element 19 will rotate in the opposite direction. Rotation of input element 15 will rotate the three output elements in the same direction.

It is clear further that a useful control or transmission mechanism may be provided with a minimum of or at least two input elements. For example input elements 13 and 14 would provide differential operation of different pairs of output shafts or elements in which event the output elements would be the shafts 29, 49, 37 and 59 or their output gears 72, 79, 86 and 93 respectively. The remaining mechanism could be dispensed with. Input element 13 would control two pairs consisting of 29 and 37 as a pair and 49 and 59 as a pair whereas input element 14 would control a different pair of output shafts or elements 29 and 49 as a pair and 37 and 59 as a pair. The input gears 103 and 115 are stationary or fixed. Any other pair of input elements may be selected to provide a two input transmission mechanism. Similarly unused mechanism may be dispensed with.

The transmission mechanism also illustrates other simpler combinations namely shafts 71, 78, 85 and 92 constitute output elements for a two input element transmission mechanism of elements 14 and 15 in which input element 14 provides a control of the pairs of output elements or shafts in opposite directions and input element 15 controls or operates all output shafts or elements in one direction.

In the more complex construction illustrated in FIG. 1, there are other lesser combinations apparent. Output shafts or elements 29, 49, 37 and 59 or their respective output gears 72, 79, 86 and 93 constitute output elements which provide two different combinations of pairs of output elements rotating in opposite directions under control of input elements 13 and 14, and input element 15 controls rotation of these output shafts or elements in one direction. Similarly input control elements 12 and 13 with input element 15 as well as input elements 12 and 14 with input element 15 provide a mechanism with three input elements to produce their respective operation or control of the output elements. In such case one of the input parts or points of the differential mechanism is to the input gears of the first differential unit or set of differential means D9, D10. Another example of a transmission mechanism having three input elements would include elements 12, 13 and 14 which provide three different pairs of output elements turned in opposite directions with the input gears for differential means D9 and D10 held stationary. In this case all of the input parts or points to the differential mechanism are carrier gears.

The construction particularly illustrated teaches that any number of plurality of output elements may be provided providing additional combinations of a plurality of output elements. As an example five output elements provide at least five combinations of pairs of output elements and a maximum of ten combinations which may be connected as taught by the illustrated four input element unit so that each pair or a plurality may be rotated in one direction and the remaining output elements may be rotated in a reverse direction. A differential unit or set of differential means is provided for each combination operatively connected together as taught herein to rotate the desired output elements in one direction and the remaining output elements in the opposite direction. An input element is provided for each combination or differential unit. There is one differential unit or set of differential means for each input element less one, the remaining one input element being connected with the input gears of the first differential unit or set of differential means or if the latter connection is not used there is one differential unit for each input element. The differential means of one differential unit is operatively connected in series with the differential means of the next unit. It is obvious too that the number of output elements may be increased by gear connecting an output element with each of the primary output elements, as taught by the gears 108, 109, 111 and gears 122, 123 and 125. A primary output element is one which is directly connected with a differential means.

A quarter revolution of rotation of the carrier gear of each differential means with its input gear stationary produces a half rotation of its output gear or provides a ratio of 2 to 1. If the gears 25, 26 and 68 and 101 have a ratio to turn its carrier gear a quarter revolution for one revolution of an input element then the output elements rotate one half revolution for each revolution of the output elements. This relationship is of no particular importance since all input elements for driving a plurality of output elements in one direction and at least one output element in the opposite direction are all alike or have the same ratio. Any gear ratio may be selected as desired but for propulsion control such as helicopter blade control they should be the same. A full rotation of the input gears of the differential mean of the first differential unit with the carrier gears stationary, produces a full rotation of the output gears or elements. This too is of no particular importance since input element 15 is connected to drive all output elements in the same direction. If desirable, input element 15 may be geared to gears 130 and 131 with a ratio such that one revolution of this input element produces a revolution ratio the same as the other input elements.

If the gears 25, 26 and 68 and 101 have a ratio with respect to their carrier gears so that one revolution of the input elements will produce half a revolution of the carrier gears then the output shafts or elements will rotate one revolution or a ratio of 1 to 1. This is the same ratio as that for control of the pitch of all of the blades of the rotors of a helicopter although it is not necessary that the input element ratio conform to the ratio between turns of the other input elements and the output elements.

It is clear too that it is not necessary that the input means be operatively connected with the carrier gears of differential means in order to secure forward and reverse directions of rotations in different output elements. For example input element 15 may be converted to this type of control merely by putting an idler gear between gear 129 and gear 130 or 131 as taught by the gear 45. Similarly any one of the input elements connected with a carrier gear may be converted to turn all output elements in one direction by inserting an idler gear between carrier gears so that all carrier gears turn in the same direction.

The first differential unit or set of differential means D9 and D10 include two differential means although it could well include four however the two differential means construction is a desirable simplification without affecting operation or results. It will be noted, that when a plurality of differential means are provided for each differential unit they are operatively connected in series with the output shaft or gear of one differential means being operatively connected with the input gear of the differential means of the next differential unit. The four differential means D1 to D4 constitute a third differential unit or set of differential means. The four differential means D5–D8 constitute a second differential unit or set of differential means and for a transmission mechanism having three input elements and two differential units it would be a last differential unit. The differential means D9 and D10 constitute a first differential unit or set of differential means. Differential means in series are provided in number one less than the number of input elements when one input element is connected with the input gears of the first differential unit in the series. When all input elements are each connected with a carrier gear and the input gears of the first differential unit are fixed or anchored then the number of sets of differential means is equal to the number of input means.

The carrier gear of each differential means is suitably mounted for rotation the means particularly shown being a casing formed by a pair of dished plates 134 for each side of a carrier gear and secured to the carrier gear and having a bearing on its respective input or output shafts. The carrier gears of the first and second differential units maybe the same size since their shafts are spaced apart the same distance. The carrier gears of the third differential unit are shown as larger to permit their meshing together without idler gears.

The rotary motions of the output elements or shafts are converted to linear movements by any suitable mechanism to connect with and operate the blades of the propulsion means such as the blades of a helicopter. Suitable mechanism is shown in the aforementioned application S.N.

761,422 now Patent 3,008,524. The input elements may be operatively connected with the control means of a helicopter as taught therein.

This invention is presented to fill a need for improvements in a differential gear transmission mechanism. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A transmission mechanism comprising a frame, output means rotatably mounted on the frame including at least three primary output elements, input means rotatably mounted on the frame including a first input element and a second input element and at least a third input element; differential mechanism operatively connecting each input element with the primary output elements including a first differential unit having at least two differential means, and at least a last differential unit having a differential means for each of the primary output elements, the number of differential units being no greater than the number of input elements and no less than the number of input elements minus one; each differential means including a carrier gear, an input gear, an output gear, and planetary gear means mounted for rotation on the carrier gear and operatively connecting the input gear and output gear; a carrier gear of each differential unit and the input gears of the first differential unit forming input parts of the differential mechanism, each output gear of the first differential unit being operatively connected with the input gear of at least one differential means of the last differential unit, each input element being operatively connected to a different input part of the differential mechanism including an input element operatively connected with a carrier gear of each differential unit to turn the carrier gears, the carrier gears of each differential unit being operatively connected together to turn the carrier gears, at least each differential unit in excess of one having its carrier gears operatively connected together to turn two carrier gears in one direction and to turn at least another carrier gear of its differential unit in a reverse direction, each differential unit having its carrier gears operatively connected to turn a different combination of a plurality of carrier gears in one direction and at least another carrier gear in a reverse direction, and each output gear of the last differential unit being operatively connected with an output element.

2. A transmission mechanism as in claim 1 in which the gear connection of at least one differential unit which control the direction of rotation of the output elements includes a connecting gear between each gear to operatively turn the gears in the same direction whereby all of the output elements turn in the same direction.

3. A transmission mechanism as in claim 2 in which the connecting gear is between the input gears of the differential means of the first differential unit to turn the input gears in the same direction.

4. A transmission mechanism as in claim 1 in which the first differential unit consists of two differential means, an operative connection between the output gear of one differential means of the first differential unit and the input gear of two of the differential means of the next differential unit, and an operative connection between the output gear of the remaining differential means of the first differential unit and the input gear of the remaining differential means of the next differential unit.

5. A transmission mechanism as in claim 1 in which the differential mechanism consists of three differential units, and an operative connection between each input element and a carrier gear of its respective differential unit.

6. A transmission mechanism as in claim 1 in which the differential mechanism consists of two differential units and three input elements, an operative connection between each of two input elements and a carrier gear of its respective differential unit, and an operative connection between the remaining input element and the input gears of the first differential unit.

7. A transmission mechanism as in claim 6 in which the first differential unit consists of two differential means, and the operating connection from the output gear of one differential means of the first differential unit being with the input gears of two differential means of the next differential unit, and the operative connection from the output gear of the remaining differential means being with the input gear of the remaining differential means of the next differential unit.

8. A transmission mechanism as in claim 7 in which the operative connection of the input element of the first differential unit with the input gears includes a connecting gear to turn the input gears in the same direction.

9. A transmission mechanism as in claim 1 in which the input means includes four input elements and the differential mechanism includes a first, a second and a third differential unit, an operative connection between each of three of the input elements and at least one carrier gear of its respective differential unit, and an operative connection between the remaining input element and the input gears of the first differential unit.

10. A transmission mechanism as in claim 9 in which the operating connection of said remaining input element with the input gears of the first differential unit is a connecting gear to turn the input gears in the same direction.

11. A transmission mechanism as in claim 9 in which the first differential unit consists of two differential means and the operating connection between the output gear of one of the differential means of the first differential unit is with the input gears of two differential means of the next differential unit and the operating connection between the output gear of the remaining differential means of the first differential unit is with the input gear of the remaining differential means of the next differential unit.

12. A transmission mechanism as in claim 11 in which the operating connection between the input element and the input gears of the differential means of the first differential unit is a connecting gear to turn the input gears in the same direction, and in which the operating connection between the output gears of the differential means of the first differential unit to the input gears of the next differential unit is a connecting gear to turn the input gears in the same direction whereby all output elements rotate in the same direction.

13. A transmission mechanism as in claim 9 in which the operating connection between each carrier gear of the second differential unit is intermeshing with its adjacent carrier gear to turn it in the opposite direction.

14. A transmission mechanism as in claim 13 in which the first differential unit consists of two differential means, and means operatively connecting the output gear of one differential means of the first differential unit with the input gear of two differential means of the second differential unit.

15. A transmission mechanism as in claim 16 in which the operative connection between the input gears of the first and of the second differential units includes a connecting gear to turn the input gears in the same direction.

16. A transmission mechanism comprising a frame, output means rotatably mounted on the frame comprising four primary output elements, input means rotatably mounted in the frame comprising four input elements; differential mechanism operatively connecting each input element with the primary output elements comprising a first differential unit and a second differential unit and a last differential unit, the first differential unit having at least two differential means, the second and last differential unit having four differential means providing one for each of the primary output elements; each differential means including a carrier gear, an input gear, an output gear, and planetary gear means rotatably mounted on the carrier gear and operatively connecting the input gear and output gear; an operative connection between the output gear of the differential means of the first and second differential units with the input gear of a differential means of its next differential unit, an operative connection between each of three input elements and a carrier gear of its respective differential unit, an operative connection between the remaining input element and the input gears of the first differential unit, an operative connection between the carrier gears of at least two differential units to turn two thereof in one direction and to turn the remaining two carrier gears in a reverse direction, the operative connection between the carrier gears of at least two of the differential units being such as to turn a different combination of the carrier gears in one direction and the remaining carrier gears in a reverse direction, and an operative connection between each output gear of the last differential unit and an output element.

17. A transmission mechanism as in claim 16 in which the first differential unit consists of two differential means, an operative connection between the output gear of each of the first differential unit and the input gears of two differential means of the second differential unit.

18. A transmission mechanism as in claim 17 in which the first differential unit consists of two differential means, the operating connection between the input element and the input gears of the differential means of the first differential unit is a connecting gear to turn the input gear in the same direction, and the operative connection between the output gear of each of the differential means of the first differential unit with the input gears of two differential means of the second differential unit includes a connecting gear between the input gears of the two differential means to turn the input gears of all differential means of the second differential unit in the same direction.

References Cited in the file of this patent

UNITED STATES PATENTS

| | | |
|---|---|---|
| 1,869,326 | Ludlow | July 26, 1932 |
| 2,574,916 | Gordon | Nov. 13, 1951 |
| 2,757,556 | Uebing | Aug. 7, 1956 |
| 2,818,746 | Hart | Jan. 7, 1958 |
| 2,957,371 | Wang | Oct. 25, 1960 |